United States Patent
Kim et al.

(10) Patent No.: US 9,491,147 B2
(45) Date of Patent: Nov. 8, 2016

(54) DRM CONTENT STREAM TRANSMISSION APPARATUS, METHOD, AND TRANSMISSION AND RECEPTION SYSTEM

(71) Applicant: MARKANY INC., Seoul (KR)

(72) Inventors: Chang Won Kim, Seoul (KR); Jeong Soo Kim, Gyeonggi-do (KR); Gyoung Soon Kim, Gyeonggi-do (KR); Jong Uk Choi, Seoul (KR)

(73) Assignee: Markany Inc., Seoul (KR)

( * ) Notice: Subject to any disclaimer, the term of this patent is extended or adjusted under 35 U.S.C. 154(b) by 82 days.

(21) Appl. No.: 14/262,909

(22) Filed: Apr. 28, 2014

(65) Prior Publication Data

US 2015/0043728 A1    Feb. 12, 2015

(30) Foreign Application Priority Data

Aug. 12, 2013 (KR) .................. 10-2013-0095627

(51) Int. Cl.

| H04L 29/06 | (2006.01) |
| H04N 19/00 | (2014.01) |
| H04N 21/00 | (2011.01) |
| H04N 19/467 | (2014.01) |
| H04N 21/2347 | (2011.01) |
| H04N 21/254 | (2011.01) |
| H04N 21/258 | (2011.01) |
| H04N 21/8358 | (2011.01) |
| H04N 21/845 | (2011.01) |

(52) U.S. Cl.
CPC ........... *H04L 63/0428* (2013.01); *H04L 65/00* (2013.01); *H04N 19/00* (2013.01); *H04N 19/467* (2014.11); *H04N 21/00* (2013.01); *H04N 21/2347* (2013.01); *H04N 21/2541* (2013.01); *H04N 21/25875* (2013.01); *H04N 21/8358* (2013.01); *H04N 21/8456* (2013.01)

(58) Field of Classification Search
None
See application file for complete search history.

(56) References Cited

U.S. PATENT DOCUMENTS

| 7,353,541 B1 * | 4/2008 | Ishibashi ................ G06F 21/10 348/E7.056 |
| 2010/0082478 A1 * | 4/2010 | Van Der Veen ........ G06F 21/10 705/39 |
| 2014/0098985 A1 * | 4/2014 | Brubeck .......... H04N 21/23892 382/100 |

* cited by examiner

*Primary Examiner* — Kaveh Abrishamkar
(74) *Attorney, Agent, or Firm* — Occhiuti & Rohlicek LLP

(57) ABSTRACT

A content stream transmission apparatus with reverse traceability comprises a pattern insertion unit dividing the original content in units of segments and inserting at least two patterns to each segment and creating at least two pattern contents; an encryption unit encrypting the at least two pattern contents; a content selection unit selecting one of the at least two pattern contents based on user identification information; and a transmission unit transmitting the selected pattern content to a user device. Therefore, as copyright and leakage tracking information are enabled to be inserted into the contents in real-time, the present invention not only provides security-enhanced contents but also services real-time content streaming services.

15 Claims, 20 Drawing Sheets

DRM CONTENT STREAM TRANSMISSION APPARATUS, METHOD, AND TRANSMISSION AND RECEPTION SYSTEM

Priority to Korean patent application number 10-2013-0095627 filed on Aug. 12, 2013, the entire disclosure of which is incorporated by reference herein, is claimed.

BACKGROUND OF THE INVENTION

1. Field of the Invention

The present invention is related to a stream transmission apparatus, method, and transmission and reception system; and more particularly, a stream transmission apparatus, method, and transmission and reception system of DRM content with reverse traceability.

2. Discussion of the Related Art

A video streaming service can be divided largely into a stage of preparing target content to be streamed and a service stage of streaming the content upon request of a user or a terminal. Service providers apply a Digital Right Management (DRM) technology to prevent leakage and duplication of content by third parties. A DRM encryption technology is applied while content is still in a compression state through one of a plurality of video compression encoders. In other words, first of all, content is compressed in a content preparation stage and undergoes an encryption process. Afterwards, the encrypted content is transmitted in the form of a file at the service stage.

However, the DRM technology is inadequate to block the leakage and duplication of decrypted content. In this regard, a forensic watermarking technology is needed, which is capable of reversely tracking a leakage path of the corresponding content. Forensic watermarking inserts forensic marks into target content by modifying RGB values of the content and saving the modified RGB values while the target content is in a decompressed state. Therefore, DRM encryption is possible only when forensic watermarks are inserted into target content before it is compressed.

To insert forensic watermarks, however, user- or User Equipment (UE)-specific information needs to be incorporated; therefore, the forensic watermarks are inserted after user-specific information is obtained. In this reason, conventional systems provide streaming services by decrypting encrypted content, decompressing the decrypted content, inserting forensic watermarks, re-compressing the content, and performing re-encryption of the content. The process consisting of decrypting, decompression, re-compression, and re-encryption can be regarded highly inefficient in terms of time and costs. Also, the conventional technology is incapable of transmitting HD content and can play only a limited number of streams even with high performance hardware.

SUMMARY OF THE INVENTION

To solve the problem above, an object of the present invention is to provide a DRM content stream transmission apparatus, method, and system which are capable of inserting forensic watermarks with high speed while DRM encryption is not applied, thereby enabling many users to stream various contents by inserting traceability information into the contents simultaneously in real-time and which enable decrypted content to be secured by inserting forensic information thereto, together with DRB encryption technology.

Another object of the present invention is to provide a DRM content stream transmission apparatus, method, and system which are capable of reversely tracking a leakage path of the original content in the case of leakage of the corresponding content by a third party.by inserting user identification information to all of the contents in service.

A content stream transmission apparatus with reverse traceability according to the present invention comprises a pattern insertion unit dividing the original content in units of segments and inserting at least two patterns to each segment and creating at least two pattern contents; an encryption unit encrypting the at least two pattern contents; a content selection unit selecting one of the at least two pattern contents based on user identification information; and a transmission unit transmitting the selected pattern content to a user device.

The pattern insertion unit can include a division unit dividing the original content by the same segment units; a pattern creation unit creating at least two patterns for each segment and inserting the at least two patterns into the content; and an encryption unit encrypting the at least two pattern contents.

The division unit can divide the original content by at least one of Group Of Pictures (GOP), slice, or MacroBlock (MB) group units.

The pattern creation unit can create at least two patterns different from each other by adjusting at least one of color, saturation, and brightness of constituting pixels of each segment.

The pattern creation unit can create at least two patterns different from each other by inserting a particular index or data into each of the segments.

The content stream transmission apparatus can further comprise an insertion pattern database (DB) which stores information related to the pattern content and information related to the division separately with content specific information.

The content selection unit can comprise a user identification information reception unit receiving user identification information with which individual users of the user devices can be identified and a selection unit selecting the pattern contents by the segment units based on the received user identification information and combining the selected pattern contents.

The user identification information can be an authentication value provided for each user at the time of authenticating a user device or a streaming service.

The content selection unit can obtain the pattern content information by loading the information from the insertion pattern DB which includes pattern and division information or by creating patterns based on the loaded information.

The selection unit can select one of the at least two pattern contents based on the user identification information by parsing the number of patterns corresponding to a base number of a particular number system or index of a reference table indicating a particular value.

A content stream transmission method with reverse traceability according to the present invention comprises a pattern insertion step dividing the original content in units of segments and creating at least two pattern contents by inserting at least two patterns into each of the segments; an encryption step encrypting the at least two pattern contents; a difference value selection step selecting any one of the at least two pattern contents based on user identification information; and a transmission step transmitting the selected pattern content to a user device.

A content stream transmission apparatus with reserve traceability according to the present invention comprises a pattern insertion unit dividing the original content into segments and creating at least two patterns for each segment; an encryption unit encrypting a difference value between the content for which the at least two pattern have been created and the original content; a difference value selection unit selecting any one of the at least two difference values based on user identification information; and a transmission unit transmitting the original content and the selected difference value to a user device.

The pattern insertion unit can include a division unit dividing the original content by the same segment units; a pattern creation unit creating at least two patterns for each segment and inserting the at least two patterns into the content; and an encryption unit encrypting the at least two pattern contents.

The division unit can divide the original content by at least one of Group Of Pictures (GOP), slice, or MacroBlock (MB) group units.

The pattern creation unit can include an insertion unit inserting a pattern into a particular pixel of the original content; and a difference value extraction unit extracting a difference value between the original content and the content into which the pattern has been inserted and storing the difference value.

The insertion unit can create at least two patterns different from each other by inserting a particular index or a data value into each of the segments.

The content stream transmission apparatus can further comprise an insertion pattern database (DB) storing the difference value and information related to the division separately with content specific information.

The difference value selection unit can comprise a user identification information reception unit receiving user identification information with which individual users of the user devices can be identified and a selection unit selecting the difference value for each of the segments based on the received user identification information.

The user identification information can be an authentication value provided for each user at the time of authenticating a user device or a streaming service.

The difference value selection unit can obtain the difference value information by loading the information from the insertion pattern DB which includes pattern and division information or by creating patterns based on the loaded information.

The selection unit can select one of the at least two difference values based on the user identification information by parsing the number of patterns corresponding to a base number of a particular number system or index of a reference table indicating a particular value.

A content stream transmission method with reverse traceability according to the present invention comprises a pattern insertion step dividing the original content in units of segments and creating at least two patterns for each of the segments; an encryption step encrypting a difference value between the content for which the at least two pattern have been created and the original content; a difference value selection step selecting any one of the at least two pattern contents based on user identification information; and a transmission step transmitting the original content and the selected difference value to a user device.

A content stream transmission apparatus with reverse traceability according to the present invention comprises a pattern insertion unit dividing compressed original content into segments and creating at least two patterns for each segment; a difference value extraction unit comparing the original content on the basis of segments with the content for which the at least two patterns have been inserted and extracting and storing at least two difference values; an encryption unit encrypting the original content and the at least two difference values; a difference value selection unit selecting one of the encrypted at least two difference values based on user identification information; and a transmission unit transmitting the selected difference value and the original content to a user device.

While storing the difference value, the difference value extraction unit can also manage location information related to the difference value.

A content stream transmission method with reverse traceability according to the present invention comprises a pattern insertion step dividing compressed original content into segments and creating at least two patterns for each segment; a difference value extraction step comparing the original content on the basis of segments with the content for which the at least two patterns have been inserted and extracting and storing at least two difference values; an encryption step encrypting the original content and the at least two difference values; a difference value selection step selecting any one of the encrypted at least two difference values based on user identification information; and a transmission step transmitting the selected difference value and the original content to a user device.

A content stream transmission and reception system with reverse traceability according to the present invention can comprise a content stream transmission apparatus dividing the original content into segments and creating at least two pattern contents by inserting at least two patterns into each segment; compressing and encrypting the at least two pattern contents; selecting any one of the at least two pattern contents based on user identification information and transmitting the selected pattern content to a user device; and a user device receiving the selected pattern content and rendering the content.

A content stream transmission and reception system with reverse traceability according to the present invention comprises a content stream transmission apparatus dividing the original content into segments and creating at least two patterns for each segment; compressing and encrypting difference values between the original content and the content for which the at least two patterns have been created; selecting any one of the at least two difference values based on user identification information; and transmitting the original content and the selected difference value to a user device; and a user device rendering content by receiving and combining the original content and the selected difference value.

BRIEF DESCRIPTION OF THE DRAWINGS

The accompanying drawings, which are included to provide a further understanding of the present invention and constitute a part of specifications of the present invention, illustrate embodiments of the present invention and together with the corresponding descriptions serve to explain the principles of the present invention.

DETAILED DESCRIPTION OF THE INVENTION

Figure 1:
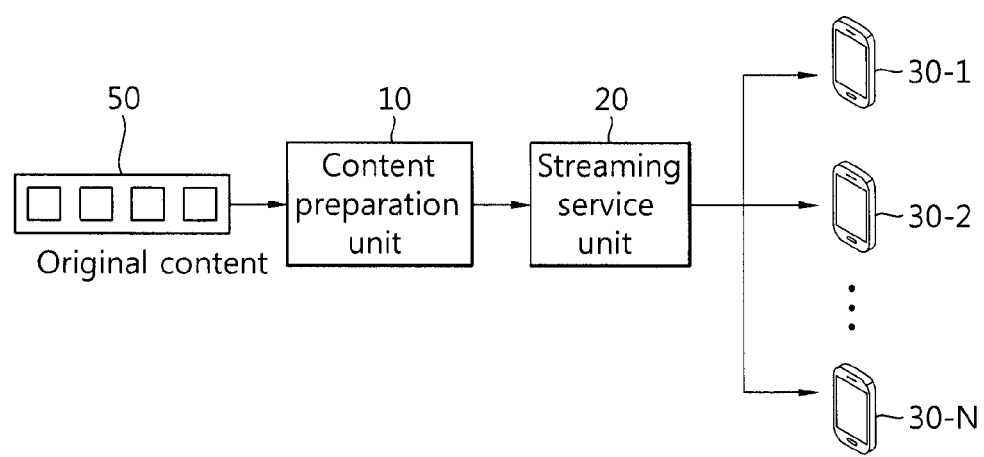
FIG. 1 is a block diagram illustrating a system to which a content stream transmission method according to one embodiment of the present invention can be applied.

The present invention can be modified in various ways, and various embodiments can be implemented; therefore, particular embodiments are described in detail with reference to accompanying drawings.

This document is not limited to the particular embodiments, but it should be understood that descriptions of this document are applied to all the possible modifications, equivalents, or substitutes which belong to the technical principles and scope of the present invention.

Terms such as first and second can be used for describing various constituting elements but the constituting elements should not be limited by the terms. The terms are introduced only for the purpose of distinguishing one constituting element from the others. For example, a first constituting element may be called a second constituting element without departing from the scope of the present invention and vice versa. Meanwhile, the term of and/or refers to a combination of a plurality of related specific elements or any one of a plurality of related specific elements.

If an element is said to be "linked" or "connected" to a different element, the element may be directly linked or connected to the different element, but a third element may exist to connect the two elements. On the other hand, if an element is said to be "directly linked" or "directly connected" to a different element, it should be understood that no other element lies between the two elements.

Terms used in this document have been introduced only for the purpose of describing particular embodiments but are not intended to limit the present invention. Singular expressions, unless otherwise indicated explicitly, can be used for plural expressions. It should be understood that such terms as "comprise" or "have" in this document are meant to indicate existence of characteristics, numerals, steps, operations, constituting elements, components or a combination thereof, but do not preclude existence or additional possibility of one or more characteristics, numerals, steps, operations, constituting elements, components, or a combination thereof.

Unless otherwise defined, all of the terms used in this document, including technical or scientific ones, carry the same meaning as understood by those skilled in the art to which the present invention belongs. Those terms as defined in an ordinary dictionary should be interpreted to hold the same meaning as contextually indicated by the corresponding technology; therefore, unless otherwise defined explicitly, they should not be interpreted in an ideal manner or in an excessive formality.

In what follows, with reference to appended drawings, preferred embodiments of the present invention will be described in more detail. To facilitate the overall understanding of the present invention, the same reference symbols are used for the same constituting elements used throughout the drawings, and descriptions about the same constituting elements will be omitted.

Content Stream Transmission Apparatus

FIG. 1 is a block diagram illustrating a system to which a content stream transmission method according to one embodiment of the present invention can be applied. As shown in FIG. 1, a content stream transmission and reception system to which a content stream transmission method according to one embodiment of the present invention can be applied can comprise a content preparation unit 10, a streaming service unit 20, and at least one user device 30-1, 30-2, . . . , 30-N.

With reference to FIG. 1, the content preparation unit 10 prepares target content to be streamed by using the original content 50 as the input. The original content 50 may be video or audio content. In some case, it can be in the form of data. The original content 50 can be in the form of a stream or file.

The content preparation unit 10 inserts watermarks meant to prevent leakage and duplication of the original content 50 in units of segments and compresses the pattern-inserted content. Various watermark insertion methods and technologies can be used to this purpose. And the compressed content can be further encrypted, for which DRM encryption technology can be applied.

The streaming service unit 20 can create a final content stream by combining encrypted content (or patterns) created by the content preparation unit 10 in units of segments based on user identification information with which a user or a user device can be identified.

The user device 30-1, 30-2, . . . , 30-N receives the final content stream and render the received content stream. At this time, user identification information with which a user can be identified is required to insert forensic watermarks, and the user device 30-1, 30-2, . . . , 30-N can provide the user identification information. The user device 30-1, 30-2, . . . , 30-N can provide user identification information to the streaming service unit 20. The streaming service unit 20 converts the user identification information received from the user device 30-1, 30-2, . . . , 30-N into a particular index. The streaming service unit 20 then parses each bit of the created index and creates a final content stream by selecting one of contents created with a plurality of patterns or combining the contents. Since the final content stream created as described above contains user identification information, a leakage path of the corresponding content can be reversely traced in the case of leakage or duplication thereof. Therefore, content security can be reinforced.

Figure 2:
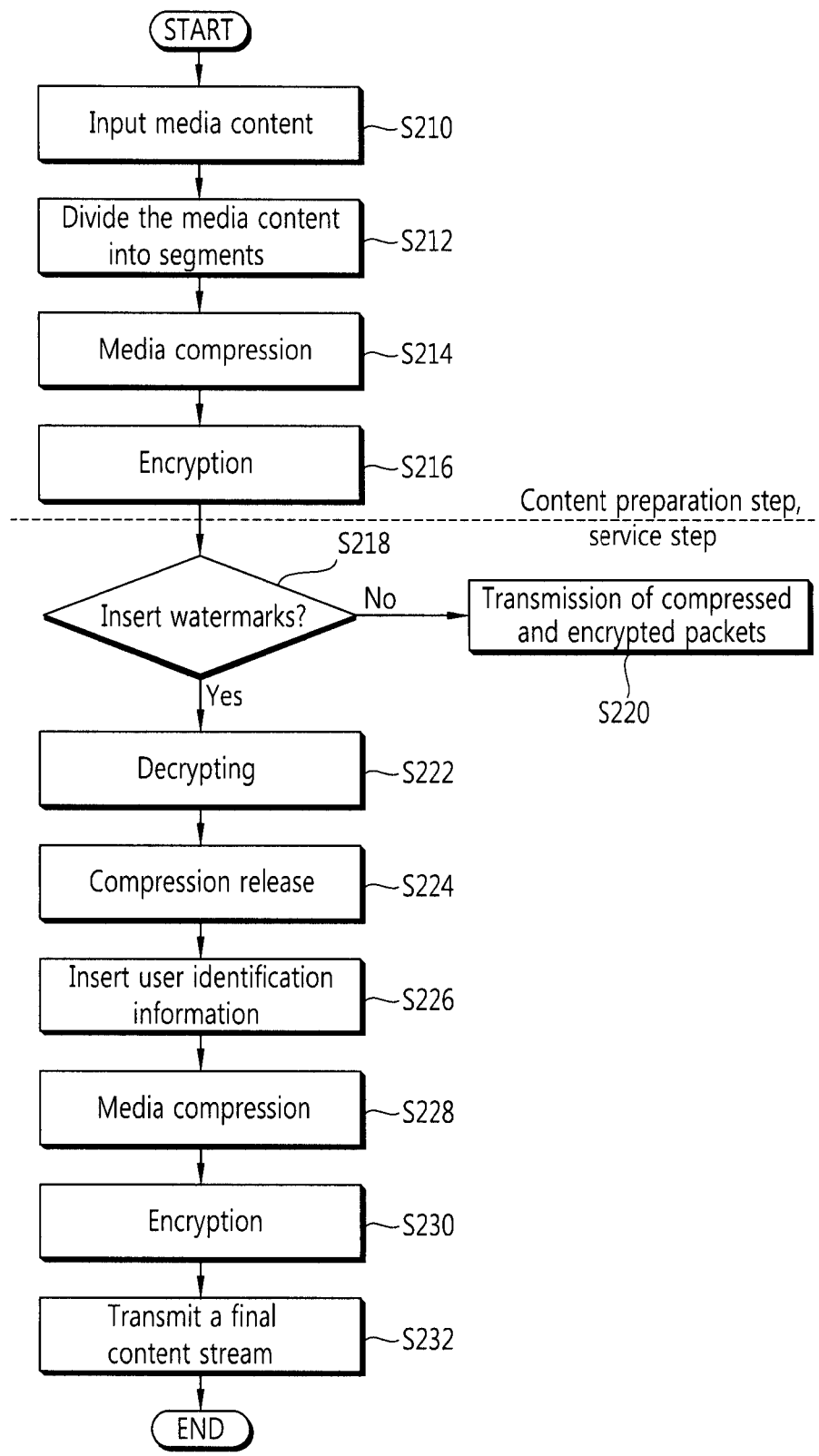
FIG. 2 is a flow diagram illustrating a conventional video content stream transmission method.

FIG. 2 is a flow diagram illustrating a conventional video content stream transmission method.

With reference to FIG. 2, a content transmission apparatus receives media content S210. The media content may be a video or audio stream, or a data stream. The media content doesn't necessarily be in the form of a stream, but can be implemented in the form of a file or in a different form. The content transmission apparatus divides the received content into streams S212. And the content transmission apparatus carries out compression in units of segments by which an encoder divides the received content S214. Next, the compressed content is encrypted by a DRM technology S216. After encryption is completed, the content is ready to be serviced.

When the content is ready, a subsequent process is required for a streaming service afterwards. At this time, a decision is made about whether it is necessary to insert forensic watermarks while basic encryption is completed S218. The decision can be made based whether the content requires enhanced security against leakage and duplication of the content. For example, separate forensic watermarks may not be needed for the services which can be open to the public free of charge, namely, those services related to contents which do not require special requirements against contents leakage or duplication. Therefore, in this case, it only has to transmit the content processed up to the current time point (compressed and encrypted) to a user device S220. If the content is a paid service, targeted for particular users, and requires reinforcement of security against leakage and duplication of the content, insertion of forensic watermarks are required. In this case, decrypting is carried out to insert user identification information to the compressed and encrypted content S222, and decompression is carried out S224. By doing so, conditions for inserting user identification information are made and user identification information is inserted S226. Afterwards, media compression is carried out again S228, and re-encryption is carried out S230. The final content stream created as described above is transmitted to a service-related user device S232.

In this case, as described above, after content is compressed and encrypted in the content preparation step, decrypting and decompression of the corresponding content are carried out, after which re-compression and re-encryption have to be carried out for insertion of forensic watermarks. The process consisting of the steps described above can be regarded inefficient leading to a waste of time and costs in view of a system process.

Figure 3:
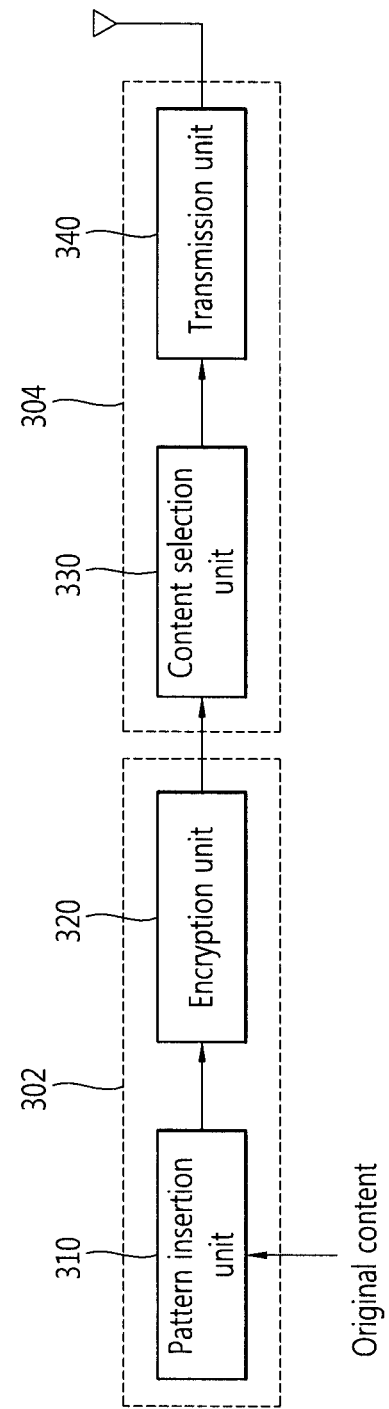
FIG. 3 is a block diagram illustrating a content stream transmission apparatus according to one embodiment of the present invention.

FIG. 3 is a block diagram illustrating a content stream transmission apparatus according to one embodiment of the present invention. As shown in FIG. 3, a content stream transmission apparatus according to one embodiment of the present invention can comprise a pattern insertion unit 310, an encryption unit 320, a content selection unit 330, and a transmission unit 340.

With reference to FIG. 3, the pattern insertion unit 310 and the encryption unit 320 are included in the content preparation unit 302 which corresponds to the part meant for preparing content. Meanwhile, the content selection unit 330 and the transmission unit 340 can be included in the streaming service unit 304 which is the part meant for providing a streaming service.

First of all, the pattern insertion unit 310 receives the original content and divides the content into segments and creates a pattern for each segment and compresses the content. At this time, it is preferable to create two or more pattern. Two or more patterns are required to select a pattern in accordance to a particular user or user device based on user identification information. At this time, a segment, namely, a division unit can be a temporal unit or a spatial unit such as a picture, slice, frame, or macroblock. The pattern insertion unit 310 creates two or more patterns for each segment. Various watermarking insertion technologies can be used, which will be described again later. Now, compressed encoding can be applied to a plurality of contents for which patterns have been created, for which various compressed encoding techniques such as High Efficiency Video Coding (HEVC), H.264, MPEG-4, MPEG-2 can be employed. Compressed encoding techniques can differ from the above and are not necessarily limited to the examples above.

The encryption unit 320 carries out encryption of the plurality of contents for which patterns have been created. Encryption, too, can be carried out for each segment in the pattern insertion unit 310, and various DRM technologies can be employed. When the encryption task in the encryption unit 320 is carried out, preparation of contents is completed.

The content selection unit 330 receives user identification information of each segment and selects one of at least two pattern contents. The content selection unit 330 receives from a user device 30 separate user identification information with which each user can be identified. User identification information can be a user device value or an authentication value provided to a streaming service server for each user at the time of user authentication. The content selection unit 330 loads encrypted pattern content information created by the content preparation unit 302 and selects the encrypted pattern content information based on the received user identification information. A final content stream can be created based on the selected pattern content information. The encrypted pattern content information includes a plurality of pattern information, and received user identification information can be converted into a particular index value; therefore, the final content stream can be created by adopting a pattern corresponding to the converted index value in units of segments. The final content stream created as described above includes forensic watermarks.

The transmission unit 340 transmits the selected pattern content to a user device 30 through wired or wireless communication. At this time, the final content stream including the pattern content can be transmitted through a broadcasting network or a communication network.

Figure 4:
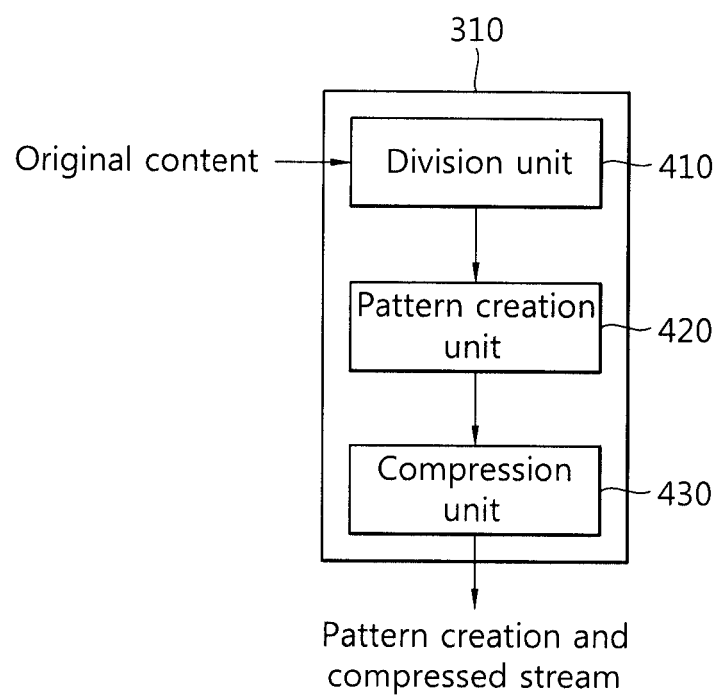
FIG. 4 is a detailed block diagram illustrating a pattern insertion unit of a content stream transmission apparatus according to one embodiment of the present invention.

FIG. 4 is a detailed block diagram illustrating a pattern insertion unit 310 of a content stream transmission apparatus according to one embodiment of the present invention. As shown in FIG. 4, the pattern insertion unit 310 according to one embodiment of the present invention comprises a division unit 410, a pattern creation unit 420, and a compression unit 430.

With reference to FIG. 4, the division unit 410 can divide the original content by predetermined units along the time axis. In other cases, the division unit 410 can divide the original content by spatial units of a particular frame. The division unit 410 can divide the original content by the same segment units. At this time, the predetermined division size can correspond to a Group Of Pictures (GOP) or larger or smaller than the GOP unit.

According to one embodiment of the present invention, a segment is a unit for creating patterns and corresponds to the unit by which a combination is carried out based on user identification information at a streaming service step. Therefore, the segment can be selected adaptively in accordance with content type, transmission environment (network or communication environment), and the number of user devices requesting reception of contents. For example, in case the transmission environment is not as good as a reference value or the number of user devices requesting reception of contents is large, the segment unit can be made larger than a particular value, thereby reducing the number of pattern creation and combination.

Depending on situations, the division unit 410 can divide an I-frame into at least one slice and MacroBlock (MB) group. At this time, the division unit 410 can divide (in other words, partition) the I-frame into at least one to N slices and MB groups. The I-frame stands for Intra-coded frame and denotes a frame created in the intra-prediction mode (in-picture prediction mode).

The pattern creation unit 420 creates and inserts at least two patterns for each segment generated through the division unit 410. The pattern creation unit 420 creates at least two patterns for each segment. In other words, at least two to arbitrary N patterns can be created for each segment. The pattern creation unit 420 can create a plurality of patterns by receiving the original content divided into segments in the division unit 410. The pattern creation unit 420 does not necessarily have to create more than two patterns but may create only two patterns (for example, pattern 1 and 2). It should be noted, however, that the more the patterns are created, the larger the choice at the time of selection operation in the content selection unit 330. At this time, there is the chance that a load for creating patterns can be large; therefore, the number of patterns can be set adaptively.

In creating at least two to N patterns, the pattern creation unit 420 can insert an index specific to a particular pixel or a data value such as 0 or 1. Individual patterns can be created in various ways by applying various watermark insertion techniques to the original content. The watermark insertion technique is not confined to a particular one (for example, a technique inserting an arbitrary index), but various existing watermark insertion techniques can be used. According to one embodiment of the present invention, the pattern creation unit 420 can create at least two patterns different from each other by adjusting any one of color, saturation, and brightness of specific pixels. For example, independent N patterns can be created by modifying part of RGB values consisting of a total of 3 bytes, each byte of which corresponds to Red, Green, and Blue.

Once the pattern creation unit 420 completes pattern creation for each segment of the original content, the compression unit 430 carries out compression of the pattern contents. The compression may actually correspond to compressed encoding, or as described above, various compressed encoding techniques can be used. According to a preferred embodiment of the present invention, the compression unit 430 can carry out compression in GOP units in the time domain or in at least one slice or MB group in the spatial domain.

When compression of individual pattern contents is completed, each of the compressed pattern contents can be encrypted by using a DRM technology through the encryption unit 330.

Figure 5:
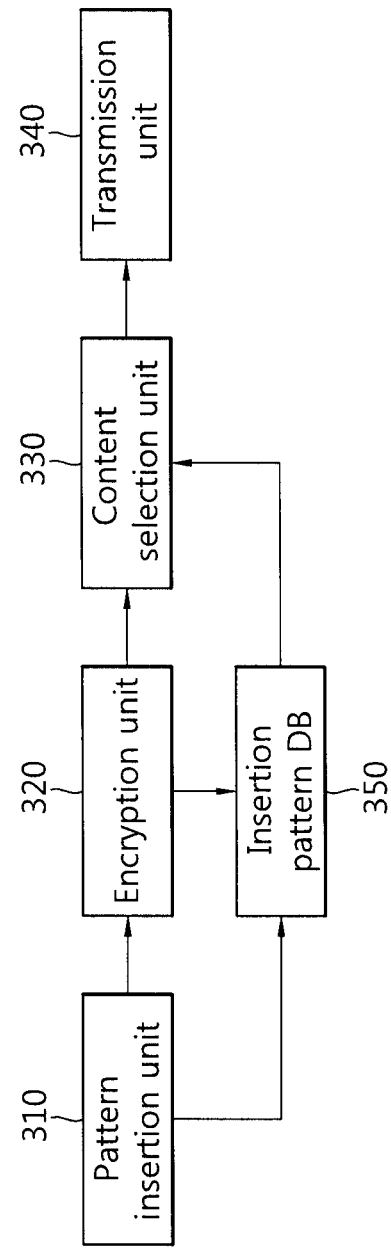
FIG. 5 is a block diagram of a content stream transmission apparatus including an insertion pattern database (DB) according to one embodiment of the present invention.

FIG. 5 is a block diagram of a content stream transmission apparatus including an insertion pattern database (DB) according to one embodiment of the present invention.

With reference to FIG. 5, the pattern insertion unit 310 can store division-related information (for example, segment size information) in the insertion pattern database 350. Also, the division-related information can be stored in the insertion pattern database 350 separately, along with N pieces of pattern content unique information where the RGB value thereof has been changed by the pattern creation unit 420 included in the pattern insertion unit 310. For example, along with unique information representing characteristics of particular content (such as content name, content size, and content type information), division-related information that the particular content has been divided in units of segments can be stored. The insertion pattern database 350 can store unique information and division-related information for each of a plurality of contents. Regarding the pattern content information, the pattern content information after encryption has been completed in the encryption unit 330 can be stored through the encryption unit 330.

The content selection unit 330 loads content specific information and division information with respect to the content specific information from the insertion pattern database 350; and uses the loaded information for acquisition of patterns. Also, the content selection unit 330 loads pattern content information from the insertion pattern database 350 and creates a pattern, thereby obtaining pattern information. Depending on situations, pattern information can be obtained by receiving encrypted pattern content information from the encryption unit 330.

Figure 6:
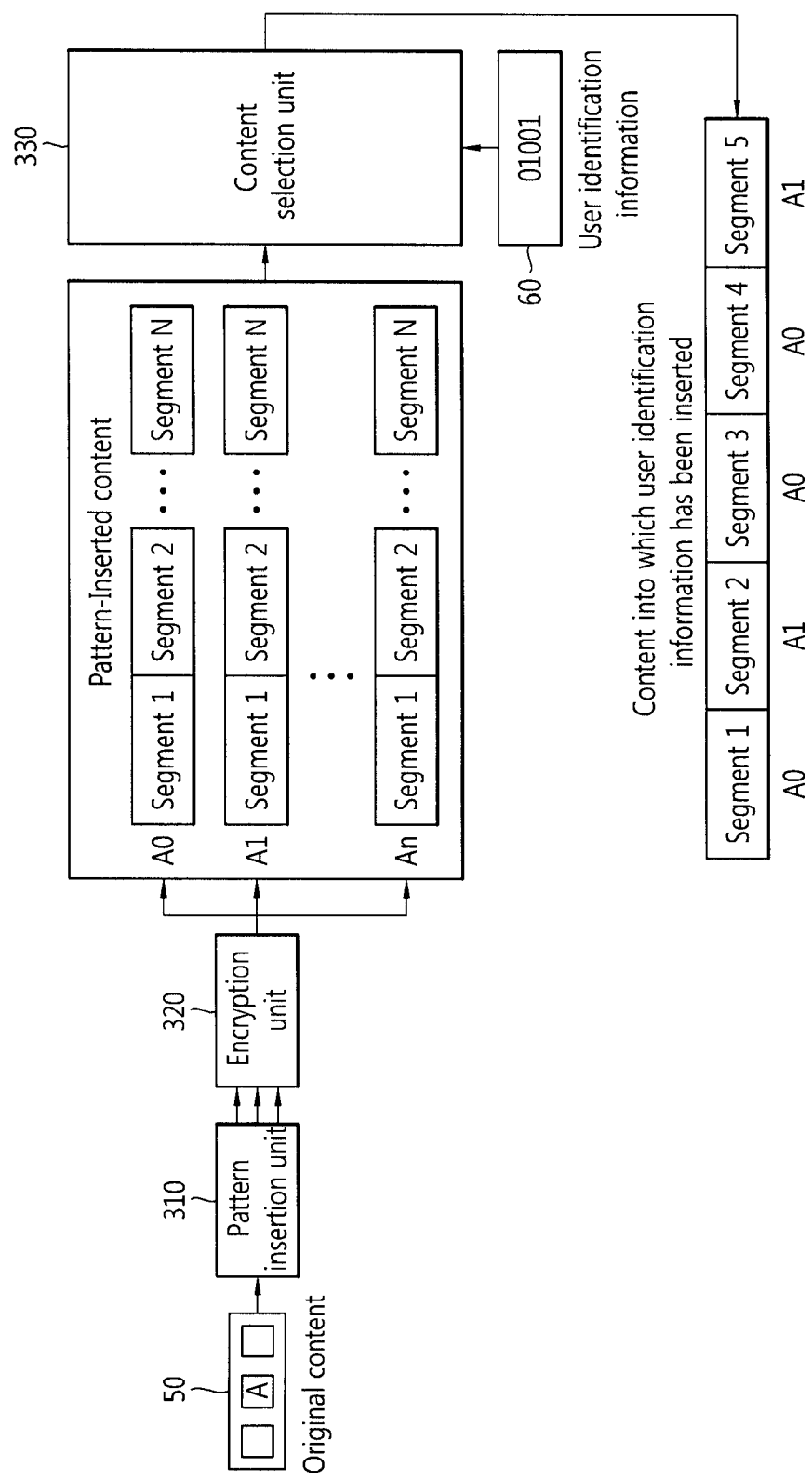
FIG. 6 illustrates a pattern combination method in a content stream transmission apparatus according to one embodiment of the present invention.

FIG. 6 illustrates a pattern combination method in a content stream transmission apparatus according to one embodiment of the present invention.

With reference to FIG. 6, pattern insertion, compression, and encryption are carried out on the original content 50 by the pattern insertion unit 310 and the encryption unit 320. Therefore, two or more pattern contents are available for each segment. The content selection unit 330 has to carry out a combination of a plurality of pattern-inserted contents so that user identification information 60 can be appropriately merged into the pattern-inserted contents.

According to one embodiment of the present invention, the content selection unit 330 receives from a user device independent user identification information 60 with which each user or user device can be distinguished. As described above, the user identification information 60 can include values such as a device value or an authentication value about a streaming service. After receiving the user identification information 60, the content selection unit 330 combines a plurality of patterns by using the received user identification information 60, thereby carrying out second watermarks. To combine patterns, the content selection unit 330 can obtain pattern information by loading pattern content information (which may be encrypted) from the insertion pattern database 350 or creating patterns by using loaded information. Or depending on situations, encrypted pattern content information can be received directly from the encryption unit 320. The content selection unit 330 inserts forensic watermarks by selecting any one of N pattern contents based on the user identification information 60. Through this process, a content transmission apparatus is enabled to insert forensic watermarks after compression and encryption of target content without carrying out decrypting, encryption, re-compression, and re-encryption thereof, thereby providing real-time streaming services.

According to one embodiment of the present invention, the content selection unit 330 converts received user identification information 60 into a base number of a particular number system and creates a final content stream by selecting and combining segments of particular patterns corresponding to the respective bits of the converted base number. For example, if user identification information 60 is a number corresponding to "9", the number can be converted to a binary number "01001", and a final content stream can be created by using pattern contents corresponding to the respective bits. In other words, in creating a final content stream about part A (which may include segment 1 to segment N) of the original content 50, in the case of "01001" which has been created by converting user identification information 60 '9', a final content stream can be created by combining segments of A0 pattern with the bit '0' while segments of A1 pattern are combined with the bit '1'. For the case of '01001' which has been converted from '9', a final stream content can be created by combining A0, A1, A0, A0, and A1 are combined in that order. The smallest combination of patterns can be 2, but a larger combination may include a base number (for example, a decimal number) larger than that of the binary number system; therefore, arbitrary N patterns can be created and combined.

Figure 7:
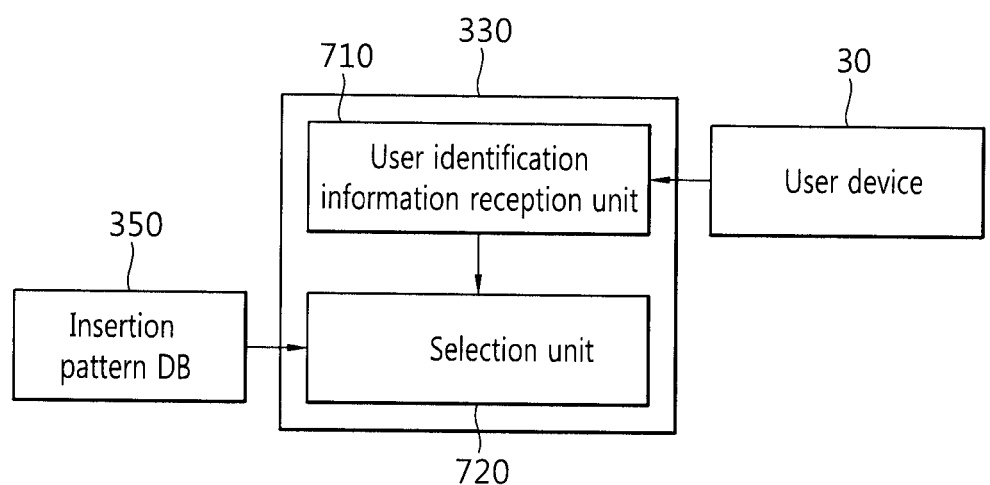
FIG. 7 is a detailed block diagram of a final content stream creation unit of a content stream transmission apparatus according to one embodiment of the present invention.
Figure 17:
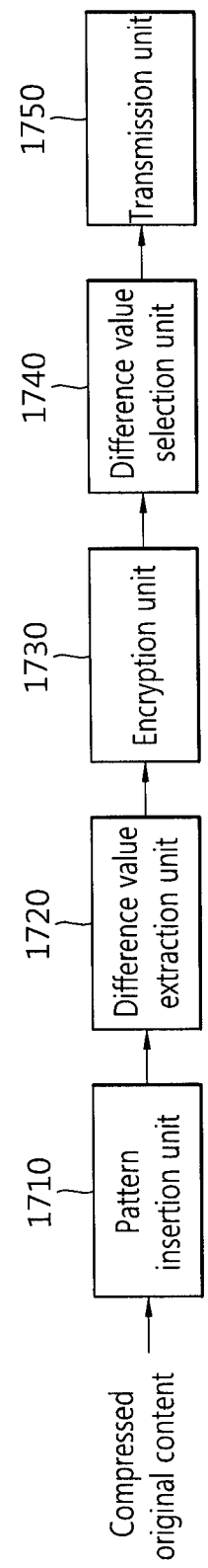
FIG. 17 is a block diagram illustrating a content stream transmission apparatus according to a yet another embodiment of the present invention.

FIG. 7 is a detailed block diagram of a final content stream creation unit 330 of a content stream transmission apparatus according to one embodiment of the present invention. As shown in FIG. 17, the final content stream creation unit 330 of the present invention can comprise a user identification information reception unit 710 and a selection unit 720.

With reference to FIG. 7, the user identification information reception unit 710 receives user identification information from a user device 30.

The selection unit 720 creates a final content stream by selecting one of at least two pattern contents by segment units based on user identification information received through the user identification information reception unit 710. The final content stream can be created by combining selected pattern contents. The selection unit 720 can obtain pattern content information by loading information from the insertion pattern database 350 including pattern and division-related information or by creating patterns based on the loaded information. At this time, the content information can correspond to the information for which media compression and encryption have been carried out.

The selection unit 720 can select one of at least two pattern contents by parsing the number of patterns corresponding to a base number of a binary number system or indices of a lookup table denoting a different number system and particular values. In other words, the selection unit 720 can include the reference table information or select pattern content by parsing indices corresponding to a particular value in accordance with received user identification information. Also, the selection unit 720 can convert the user identification information into a binary number and carry out selection based on the number of patterns corresponding to the binary number, which will be described with reference to FIG. 8.

Figure 8:
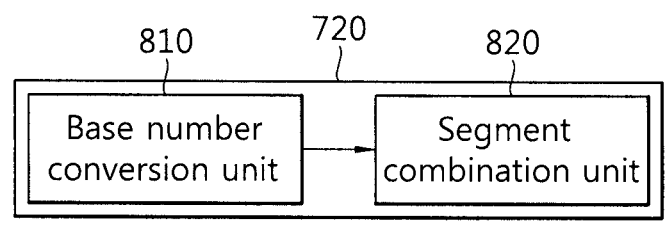
FIG. 8 is a detailed block diagram of a selection unit of a content stream transmission apparatus according to one embodiment of the present invention.

FIG. 8 is a detailed block diagram of a selection unit 720 of a content stream transmission apparatus according to one embodiment of the present invention. As shown in FIG. 8, the selection unit 720 can include a base number conversion unit 810 and a segment combination unit 820.

With reference to FIG. 8, the base number conversion unit 810 can convert the user identification information to a base number of a particular number system. According to a preferred embodiment of the present invention, the base number conversion unit 810 can convert a base number according to the number of created patterns. In other words, in case ten patterns are created, the base number is preferably converted in accordance to the decimal number system; in the case of 15 patterns, the base number is preferably converted in accordance to the penta-decimal number system.

The segment combination unit 820 can create the final content stream by combining a segment of a particular pattern corresponding to each bit of the converted base number. The segment combination unit 820 searches for the contents into which patterns corresponding to the respective bits of the values converted by the base number conversion unit 810 with respect to individual segments and creates a final content stream by combining the searched contents. The created, final content stream is based on user identification information and therefore, even in the case of leakage and duplication of the contents afterwards, user identification information can be detected by parsing the stream, which brings very strong security. The generated, final content stream can be streamed through the transmission unit 340.

Transmission of Difference Value

As described above, streaming can be carried out by preparing content by compressing and encrypting pattern-inserted contents (pattern contents); and selecting one of pattern contents and combining to create a final content stream. In terms of compression, encryption, and storage efficiency, however, it is not preferable to transmit the original content itself with inserted patterns. Therefore, according to another embodiment of the present invention, pattern content is compared with the original content and only the difference values between the two (a difference image in the case of images) can be transmitted separately from the original content. In what follows, an embodiment where difference values are transmitted separately from the original content will be described in detail.

Figure 9:
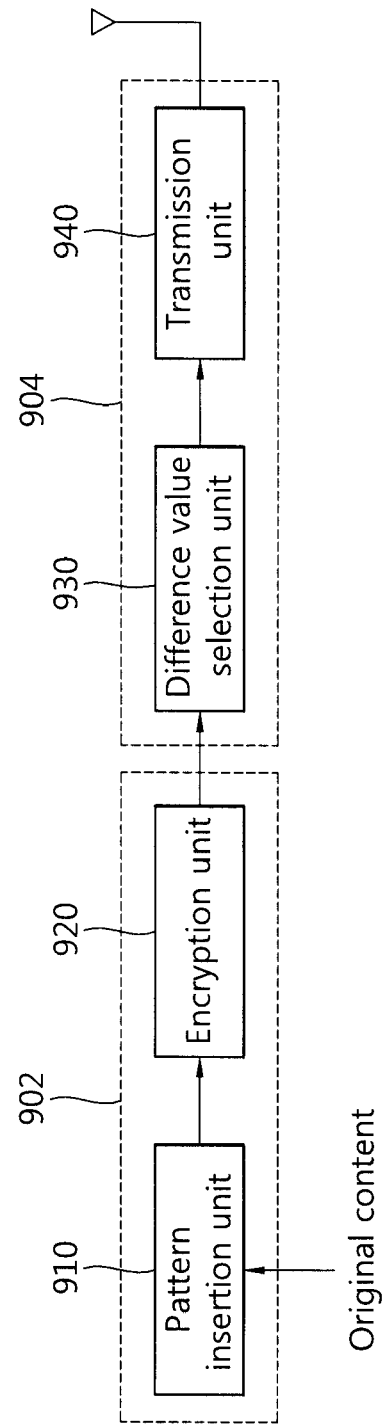
FIG. 9 is a block diagram briefly illustrating a content stream transmission apparatus according to another embodiment of the present invention.

FIG. 9 is a block diagram briefly illustrating a content stream transmission apparatus according to another embodiment of the present invention. As shown in FIG. 9, a content stream transmission apparatus according to another embodiment of the present invention can comprise a pattern insertion unit 910, encryption unit 920, difference value selection unit 930, and transmission unit 940.

With reference to FIG. 9, the pattern insertion unit 910 and the encryption unit 920 are included in the content preparation unit 902 which corresponds to the part meant for preparing content. Meanwhile, the difference value selection unit 930 and the transmission unit 940 can be included in the streaming service unit 904 which is the part meant for providing a streaming service.

First of all, the pattern insertion unit 910 receives the original content and divides the content into segments and creates a pattern for each segment and compresses the content. At this time, it is preferable to create two or more pattern. Two or more patterns are required to select a pattern in accordance to a particular user or user device based on user identification information. At this time, a segment, namely, a division unit can be a temporal unit or a spatial unit such as a picture, slice, frame, or macroblock. The pattern insertion unit 910 creates two or more patterns for each segment. Various watermarking insertion technologies can be used. After pattern creation, difference values between pattern-created content and the original content are extracted and stored. Now, compressed encoding can be applied to a plurality of contents for which patterns have been created, for which various compressed encoding techniques such as High Efficiency Video Coding (HEVC), H.264, MPEG-4, MPEG-2 can be employed. Compressed encoding techniques can differ from the above and are not necessarily limited to the examples above.

The encryption unit 920 carries out encryption of the plurality of contents for which patterns have been created. Encryption, too, can be carried out for each segment in the pattern insertion unit 910, and various DRM technologies can be employed. When the encryption task in the encryption unit 920 is carried out, preparation of contents is completed.

The difference value selection unit 930 receives user identification information of each segment and selects one of at least two difference values. The difference value selection unit 930 receives from a user device 30 separate user identification information with which each user can be identified. User identification information can be a user device value or an authentication value provided to a streaming service server (which can be a final content stream creation unit) for each user at the time of user authentication. The difference value selection unit 930 loads encrypted difference value information created by the content preparation unit 902 and selects the encrypted difference value information based on the received user identification information. A final content stream can be created based on the selected difference value information. The encrypted difference value information includes a plurality of pattern information, and received user identification information can be converted into a particular index value; therefore, the final content stream can be created by adopting a pattern corresponding to the converted index value in units of segments. The final content stream created as described above includes forensic watermarks.

The transmission unit 940 transmits the selected difference values and the original content to a user device 30 through wired or wireless communication. At this time, the final content stream and the original content stream through difference values can be transmitted through a broadcasting network or a communication network.

Figure 10:
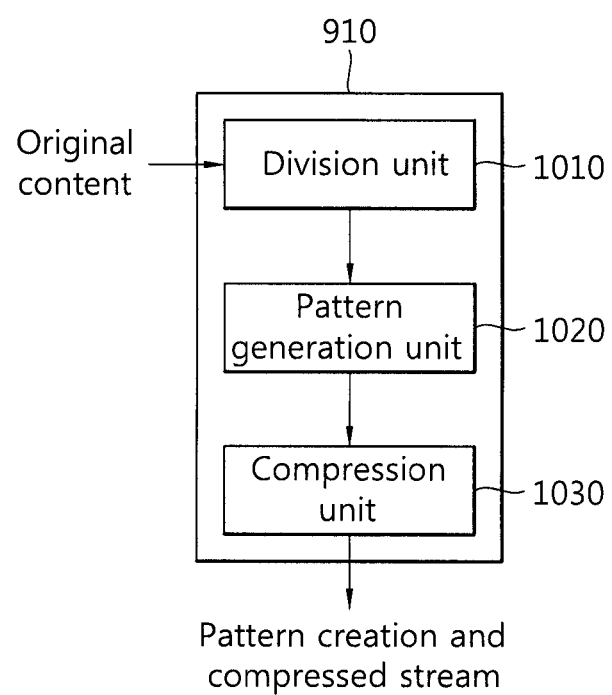
FIG. 10 is a detailed block diagram of a pattern insertion unit of a content stream transmission apparatus according to another embodiment of the present invention.

FIG. 10 is a detailed block diagram of a pattern insertion unit 910 of a content stream transmission apparatus according to another embodiment of the present invention. As shown in FIG. 10, the pattern insertion unit 910 according to another embodiment of the present invention comprises a division unit 1010, a pattern creation unit 1020, and a compression unit 1030.

With reference to FIG. 10, the division unit 1010 can divide the original content by predetermined units along the time axis. In other cases, the division unit 1010 can divide the original content by spatial units of a particular frame. The division unit 1010 can divide the original content by the same segment units. At this time, the predetermined division size can correspond to a Group Of Pictures (GOP) or larger or smaller than the GOP unit.

According to one embodiment of the present invention, a segment is a unit for creating patterns and corresponds to the unit by which a combination is carried out based on user identification information at a streaming service step. Therefore, the segment can be selected adaptively in accordance with content type, transmission environment (network or communication environment), and the number of user devices requesting reception of contents.

According to an embodiment of the present invention, the division unit 1010 can divide an I-frame into at least one slice and MacroBlock (MB) group. At this time, the division unit 1010 can divide (in other words, partition) the I-frame into at least one to N slices and MB groups.

The pattern creation unit 1020 creates and inserts at least two patterns for each segment generated through the division unit 1010. The pattern creation unit 1020 creates at least two patterns for each segment. In other words, at least two to arbitrary N patterns can be created for each segment.

Figure 11A:
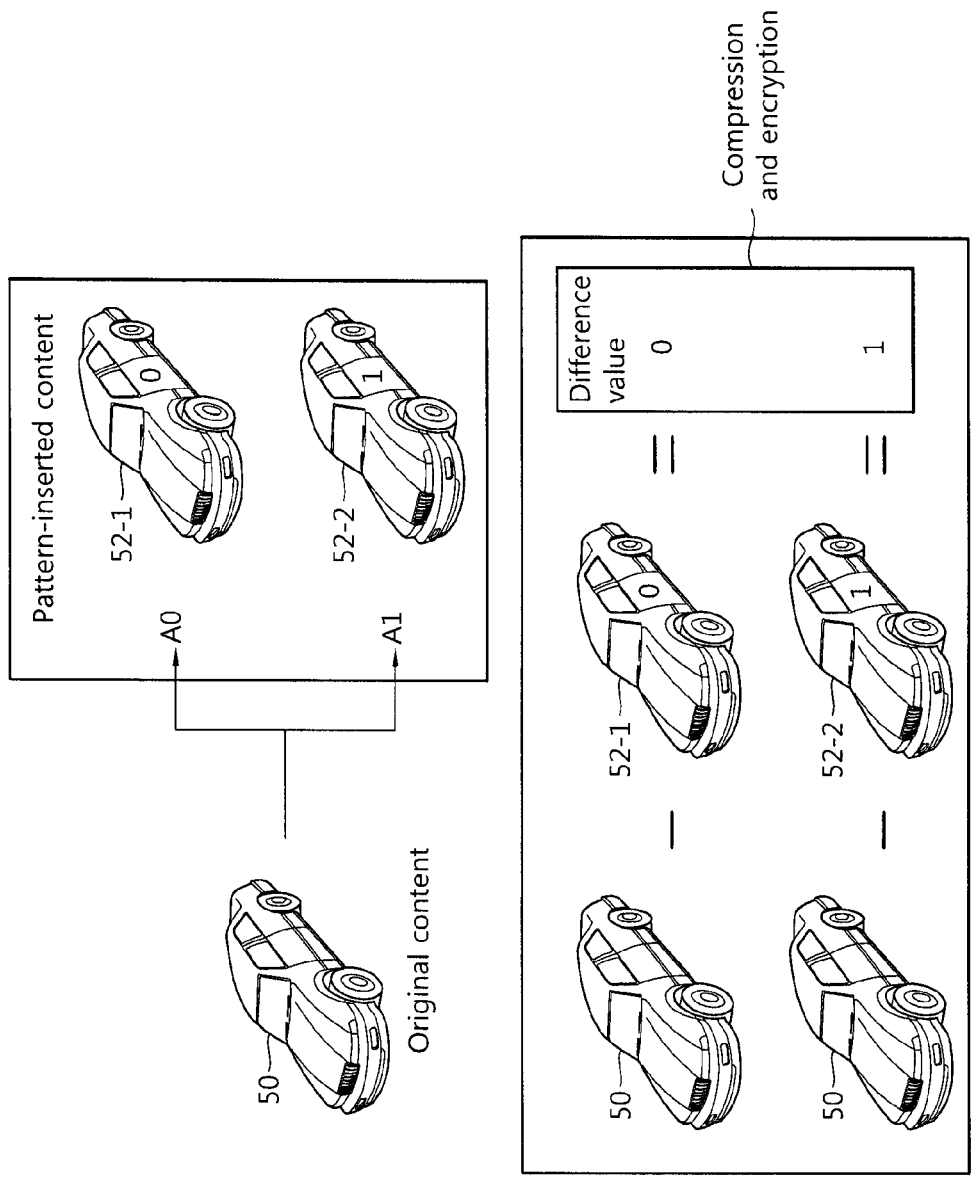
FIG. 11A illustrates a concept that a pattern insertion unit of a content stream transmission apparatus according to another embodiment of the present invention inserts a pattern to the original content and processes the pattern-inserted content.

FIG. 11a illustrates a concept that a pattern insertion unit of a content stream transmission apparatus according to another embodiment of the present invention inserts a pattern to the original content and processes the pattern-inserted content.

With reference to FIG. 11a, the pattern insertion unit 910 can insert a first watermark pattern by inserting a specific index (which is 0 and 1 in the embodiment of FIG. 11a) into a spatial pixel value of the original content 50. Then, the pattern insertion unit 910 compares the original content 50 with the content for which patterns have been inserted 52-1, 52-2 and extracts and stores difference values (a difference image in the case of images). Afterwards, the difference values can be compressed and encrypted through a compression unit and encryption unit.

Figure 11B:
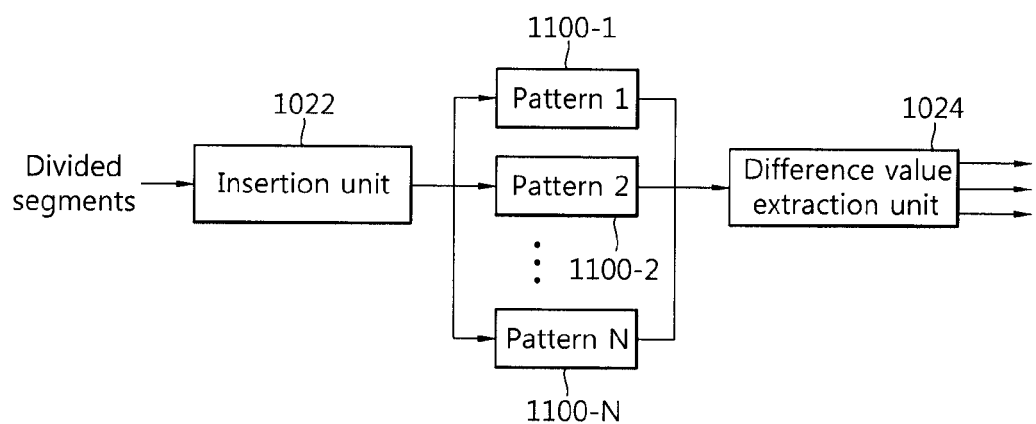
FIG. 11B illustrates a case where a pattern creation unit of a content stream transmission apparatus according to another embodiment of the present invention creates a plurality of patterns.

FIG. 11b illustrates a case where a pattern creation unit 1020 of a content stream transmission apparatus according to another embodiment of the present invention creates a plurality of patterns. As shown in FIG. 11b, the pattern creation unit 1020 according to another embodiment of the present invention can comprise an insertion unit 1022 and a difference value extraction unit 1024.

With reference to FIG. 11b, the insertion unit 1022 can create a plurality of patterns 1100-1, 1100-2, . . . , 1100-N by receiving the original content divided into segments in the division unit 1010. The insertion unit 1022 does not necessarily have to create more than two patterns but may create only two patterns (for example, pattern 1 1100-1 and 2 1100-2). It should be noted, however, that the more the patterns 1100-1, 1100-2, . . . , 1100-N are created, the larger the choice at the time of selection operation in the difference value selection unit 930. At this time, there is the chance that a load for creating patterns can be large; therefore, the number of patterns can be set adaptively.

In creating at least two to N patterns 1100-1, 1100-2, . . . , 1100-N, the insertion unit 1022 can insert an index specific to a particular pixel or a data value such as 0 or 1. Individual patterns 1100-1, 1100-2, . . . , 1100-N can be created in various ways by applying various watermark insertion techniques to the original content. The watermark insertion technique is not confined to a particular one (for example, a technique inserting an arbitrary index), but various existing watermark insertion techniques can be used.

According to another embodiment of the present invention, the insertion unit 1020 can create at least two patterns different from each other by adjusting any one of color, saturation, and brightness of specific pixels. For example, independent N patterns 1100-1, 1100-2, ..., 1100-N can be created by modifying part of RGB values consisting of a total of 3 bytes, each byte of which corresponds to Red, Green, and Blue.

The difference value extraction unit 1024 extracts and stores not only the original content but also difference values representing the difference between the original content and pattern-inserted content (for example, in case the original content is an image, the difference values can correspond to a difference value). The difference value extraction unit 1020 can create difference values corresponding to N patterns 1100-1, 1100-2, ..., 1100-N. Afterwards, compressed and encrypted content information can be difference values corresponding to the original content information and the patterns 1100-1, 1100-2, ..., 1100-N. Through the difference values, first watermark insertion is carried out. Second watermark insertion is carried out through the difference value creation unit 930, and as a result, through the first and second watermark insertion task, insertion of forensic watermarks can be carried out based on user identification information.

Returning to FIG. 10, once the pattern creation unit 1020 completes pattern creation and difference value extraction for each segment of the original content, the compression unit 1030 carries out compression of the pattern contents. The compression may actually correspond to compressed encoding, or as described above, various compressed encoding techniques can be used. According to a preferred embodiment of the present invention, the compression unit 1030 can carry out compression in GOP units in the time domain or in at least one slice or MB group in the spatial domain.

When compression of individual difference values is completed, each of the compressed difference values can be encrypted by using a DRM technology through the encryption unit 930. The encryption unit 930 can encrypt the original content.

Figure 12:
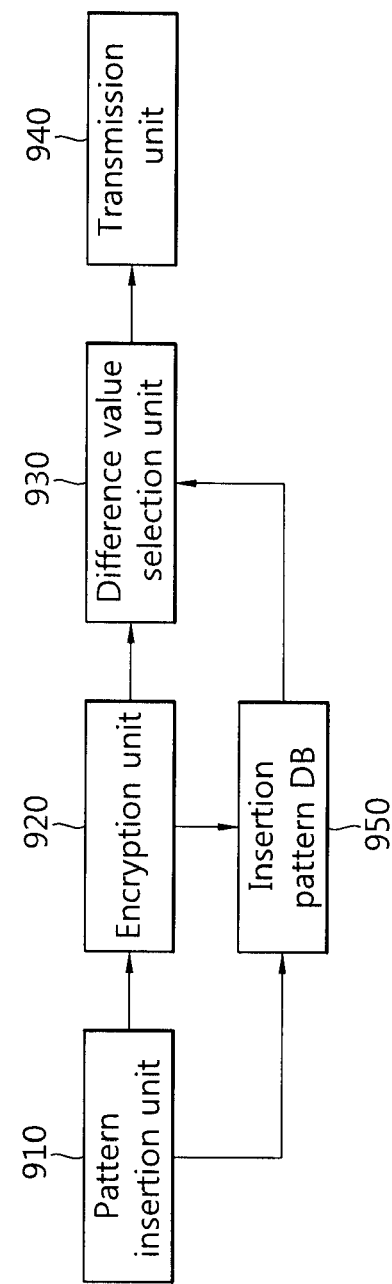
FIG. 12 is a block diagram illustrating a content stream transmission apparatus including an insertion pattern database (DB) according to another embodiment of the present invention.

FIG. 12 is a block diagram illustrating a content stream transmission apparatus including an insertion pattern database (DB) according to another embodiment of the present invention.

With reference to FIG. 12, the pattern insertion unit 910 can store division-related information (for example, segment size information) in the insertion pattern database 950. Also, the N difference values whose RGB values have been changed by the pattern creation unit 1020 included in the pattern insertion unit 910 can be stored in the insertion pattern database 950 separately, along with content-specific information (for example, information indicating content 1). For example, along with unique information representing characteristics of content 1 (such as content name, content size, and content type information), division-related information that the content 1 has been divided in units of segments can be stored, and difference value information can be stored additionally in the insertion pattern database 950. The insertion pattern database 950 can store unique information, division-related information, and difference value information for each of a plurality of contents. Regarding the difference value information, the difference value information after encryption has been completed in the encryption unit 930 can be stored through the encryption unit 930. Depending on situations, the encryption unit 930 can store not only the difference value information but also information related to the original content in the insertion pattern database 950.

The difference value selection unit 930 can load content-specific information and division-related information corresponding thereto from the insertion pattern database 950, and use the information for obtaining patterns. Also, the difference value selection unit 930 receives encrypted information related to the original content from the encryption unit 930 and creates patterns by loading pattern-related information, namely, encrypted difference values from the insertion pattern database 950, thereby obtaining pattern information. Depending on situations, pattern information can be obtained by receiving both of the encrypted information related to the original content and difference value information from the encryption unit 930; similarly, pattern information can be obtained by loading both of the information related to the original content and difference value information from the insertion pattern database 950.

Figure 13:
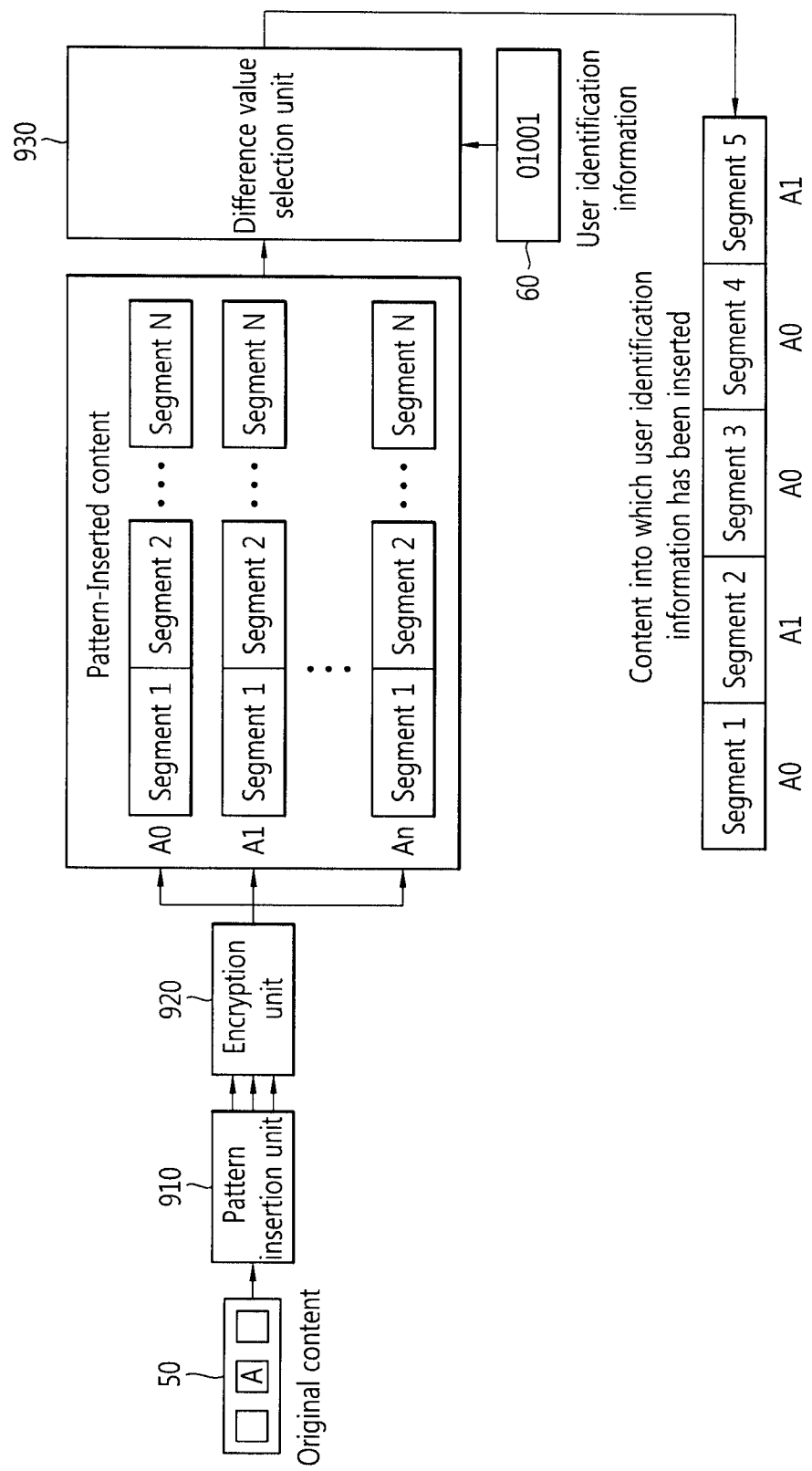
FIG. 13 illustrates a pattern combination method in a content stream transmission apparatus according to another embodiment of the present invention.

FIG. 13 illustrates a pattern combination method in a content stream transmission apparatus according to another embodiment of the present invention.

With reference to FIG. 13, pattern insertion, difference value extraction, compression, and encryption are carried out on the original content 50 by the pattern insertion unit 910 and the encryption unit 920. Therefore, two or more difference values are available for each segment. The difference value selection unit 930 has to carry out a combination of a plurality of pattern-inserted contents (where contents can be difference values) so that user identification information 60 can be appropriately merged into the pattern-inserted contents.

According to one embodiment of the present invention, the content selection unit 330 receives from a user device independent user identification information 60 with which each user or user device can be distinguished. As described above, the user identification information 60 can include values such as a device value or an authentication value about a streaming service. After receiving the user identification information 60, the content selection unit 330 combines a plurality of patterns by using the received user identification information 60, thereby carrying out second watermarks. To combine patterns, the content selection unit 330 can obtain pattern information by loading pattern content information (which may be encrypted) from the insertion pattern database 350 or creating patterns by using loaded information. Or depending on situations, encrypted pattern content information can be received directly from the encryption unit 320. The content selection unit 330 inserts forensic watermarks by selecting any one of N pattern contents based on the user identification information 60. Through this process, a content transmission apparatus is enabled to insert forensic watermarks after compression and encryption of target content without carrying out decrypting, encryption, re-compression, and re-encryption thereof, thereby providing real-time streaming services.

According to another embodiment of the present invention, received user identification information 60 is converted into a base number of a particular number system, and a final content stream is created by selecting and combining segments of particular patterns corresponding to the respective bits of the converted base number. For example, if user identification information 60 is a number corresponding to "9", the number can be converted to a binary number "01001", and a final content stream can be created by using difference values corresponding to the respective bits. In other words, in creating a final content stream about part A (which may include segment 1 to segment N) of the original content 50, in the case of "01001" which has been created by converting user identification information 60 '9', a final content stream can be created by combining segments of A0 pattern with the bit '0' while segments of A1 pattern are combined with the bit '1'. For the case of '01001' which has been converted from '9', a final stream content can be created by combining A0, A1, A0, A0, and A1 are combined in that order. The smallest combination of patterns can be 2, but a larger combination may include a base number (for example, a decimal number) larger than that of the binary number system; therefore, arbitrary N patterns can be created and combined.

Figure 14:
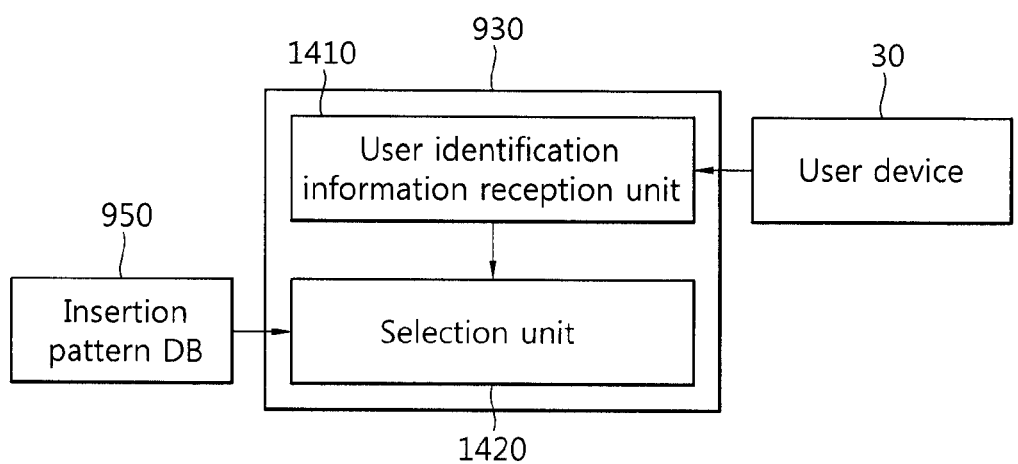
FIG. 14 is a detailed block diagram of a final content stream creation unit of a content stream transmission apparatus according to another embodiment of the present invention.

FIG. 14 is a detailed block diagram of a final content stream creation unit 930 of a content stream transmission apparatus according to another embodiment of the present invention. As shown in FIG. 13, the final content stream creation unit 930 of the present invention can comprise a user identification information reception unit 1410 and a selection unit 1420.

With reference to FIG. 14, the user identification information reception unit 1410 receives user identification information from a user device 30.

The selection unit 1420 creates a final content stream by selecting one of at least two difference values by segment units based on user identification information received through the user identification information reception unit 1410. The final content stream can be created by combining selected difference values. The selection unit 1420 can obtain difference value information by loading information from the insertion pattern database 950 including pattern and division-related information or by creating patterns based on the loaded information. At this time, the difference value information can correspond to the information for which media compression and encryption have been carried out.

The selection unit 1420 can select one of at least two difference values by parsing the number of patterns corresponding to a base number of a binary number system or indices of a lookup table denoting a different number system and particular values. In other words, the selection unit 1420 can include the reference table information or select difference values by parsing indices corresponding to a particular value in accordance with received user identification information. Also, the selection unit 1420 can convert the user identification information into a binary number and carry out selection based on the number of patterns corresponding to the binary number, which will be described with reference to FIG. 14.

Figure 15:
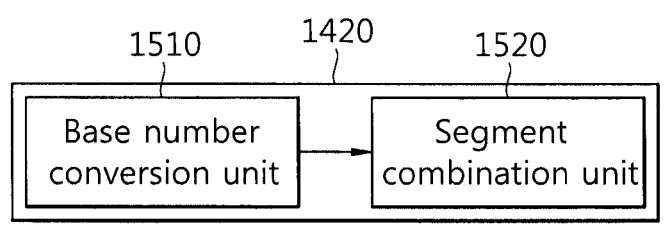
FIG. 15 is a detailed block diagram of a selection unit of a content stream transmission apparatus according to another embodiment of the present invention.

FIG. 15 is a detailed block diagram of a selection unit 1420 of a content stream transmission apparatus according to another embodiment of the present invention. As shown in FIG. 15, the selection unit 1420 can include a base number conversion unit 1510 and a segment combination unit 1520.

With reference to FIG. 15, the base number conversion unit 1510 can convert the user identification information to a base number of a particular number system. According to a preferred embodiment of the present invention, the base number conversion unit 1510 can convert a base number according to the number of created patterns. In other words, in case ten patterns are created, the base number is preferably converted in accordance to the decimal number system; in the case of 15 patterns, the base number is preferably converted in accordance to the penta-decimal number system.

The segment combination unit 1520 can create the final content stream by combining a segment of a particular pattern corresponding to each bit of the converted base number. The segment combination unit 1520 searches for the contents into which patterns corresponding to the respective bits of the values converted by the base number conversion unit 1510 with respect to individual segments and creates a final content stream by combining the searched contents. The created, final content stream is based on user identification information and therefore, even in the case of leakage and duplication of the contents afterwards, user identification information can be detected by parsing the stream, which brings very strong security. The generated, final content stream can be streamed through the transmission unit 940. Selected difference values and the original content can be transmitted separately from each other.

Content Stream Transmission Method

Figure 16:
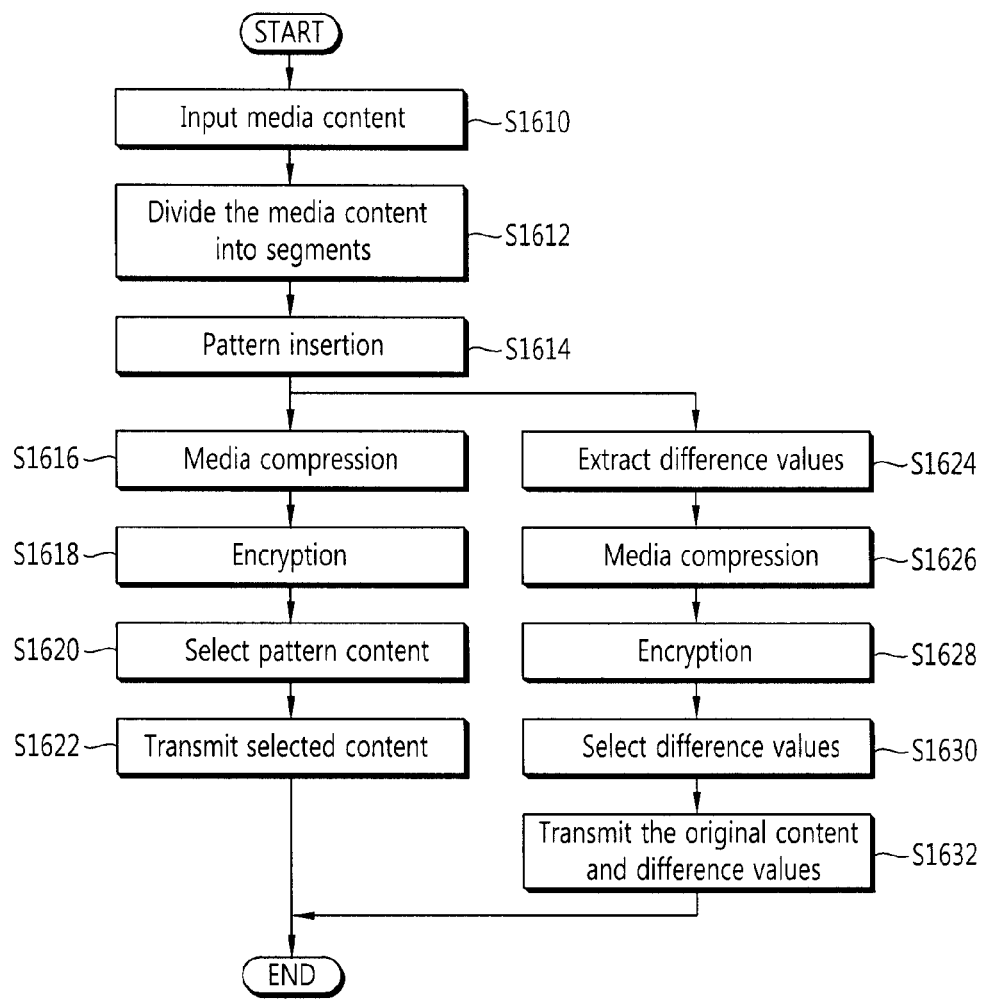
FIG. 16 is a block diagram briefly illustrating a content stream transmission apparatus according to one embodiment of the present invention.

FIG. 16 is a block diagram briefly illustrating a content stream transmission apparatus according to one embodiment of the present invention.

With reference to FIG. 16, a content stream transmission apparatus receives media content as an input S1610. Media content can be video, audio, or data content. Also, the media content can be made of a combination of video, audio, and data. The content stream transmission apparatus divides the media content into, for example, segments by employing a division unit of a pattern insertion unit S1612. Next, the content stream transmission apparatus inserts a plurality of patterns into the original content by employing a pattern creation unit and creates contents for which a plurality of patterns have been created S1614. At this time, a method for compressing and encrypting pattern-inserted content and transmitting the compressed and encrypted pattern-inserted content to a receiver can be used by default. Optionally, a method for transmitting difference values between the pattern-inserted content and the original content can be employed.

In case pattern-inserted content (pattern content) is transmitted directly, media compression is carried out on a plurality of pattern contents S1616. And the compressed pattern contents are encrypted S1618. Next, one of a plurality of encrypted pattern contents is selected based on user identification information S1620. Finally, selected pattern content is transmitted to a user device S1622.

In case a method for transmitting difference values is selected, N difference values (a difference image in the case of images) representing difference between pattern-inserted content and the original content are created S1624. Then content preparation is completed by carrying out media compression S1626 and encryption S1628 on the difference values and storing the compressed and encrypted difference values in an insertion pattern database. When content preparation is completed, the content stream transmission apparatus receives independent user identification information at a service step and selects one of at least one difference value based on the user identification information loaded from the insertion pattern database or through pattern creation S1630. Through this process, forensic watermarks are inserted, a final content stream for which compression and encryption have been carried out is created, and selected difference values and the original content are streamed to a user device S1632.

In view of the user device, in case pattern contents are received directly, the user device can render the received pattern contents directly; in case difference values and the original content are received separately from each other, the user device can perform image rendering by combining the difference values and the original content received separately from each other.

Processing of Compressed Original Content

According to another embodiment of the present invention, the content stream transmission apparatus can create pattern after the original content is compressed and prepare the original content by encrypting the created patterns. In other words, even if compression has been carried out before pattern creation, pattern contents can still be created by dividing the compressed original content by predetermined units and inserting patterns. And a final content stream can be created by selecting and combining pattern contents based on user identification information and transmitted to a user device.

Depending on situations, the content stream transmission apparatus inserts patterns into the compressed original content, extracts difference values between pattern content and the original content, combines the extracted difference values according to user identification information, and transmits the combined, extracted difference values to the user device. In what follows, the aforementioned process will be described.

FIG. 17 is a block diagram illustrating a content stream transmission apparatus according to a yet another embodiment of the present invention. As shown in FIG. 17, a content stream transmission apparatus according to a yet another embodiment of the present invention can comprise a pattern insertion unit 1710, a difference value extraction unit 1720, an encryption unit 1730, a difference value selection unit 1740, and a transmission unit 1750.

With reference to FIG. 17, even when the original content is compressed, watermark insertion and encryption can be carried out.

The pattern insertion unit 1710 divides the original content after compression into segments and inserts first watermark patterns. The difference value extraction unit 1720 compares the original content with pattern-inserted content for each segment and in case a difference is detected, manages the corresponding location information together while storing the contents. The encryption unit 1730 extracts difference values (a difference image in the case of images) separately, which represent the difference between the original content and pattern-inserted content and encrypts the extracted difference values, thereby completing content preparation.

In a service step, the difference value selection unit 1740 selects a particular difference value by using user identification information received from a user device. The transmission unit 1750 transmits the selected difference values and the original content separately to a user device.

Figure 18:
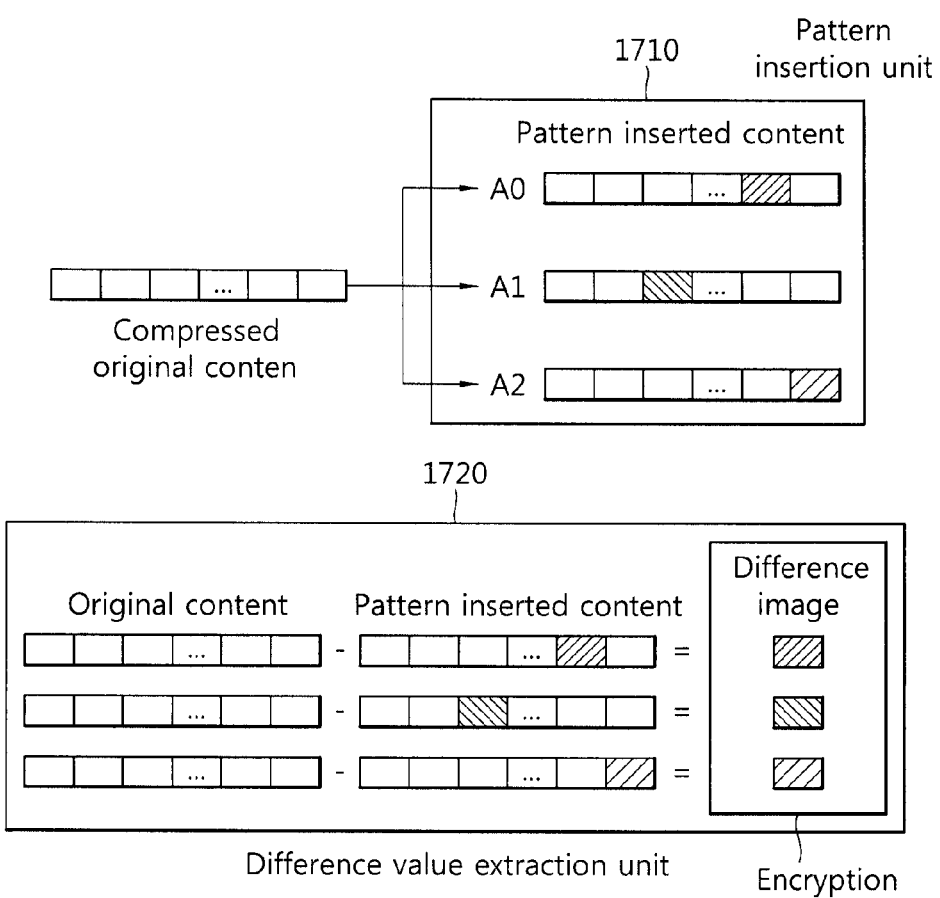
FIG. 18 illustrates operation of a pattern insertion unit and a difference value extraction unit of a content stream transmission apparatus according to a still another embodiment of the present invention.

FIG. 18 illustrates operation of a pattern insertion unit 1710 and a difference value extraction unit 1720 of a content stream transmission apparatus according to a still another embodiment of the present invention.

With reference to FIG. 18, the pattern insertion unit 1710 receives compressed original content as an input and divides the received compressed original content into segments. And the pattern insertion unit 1710 inserts patterns for each segment and creates pattern-inserted content.

The difference value extraction unit 1720 creates difference values by comparing the original content with the pattern-inserted content for each segment. In case the original content is an image, the difference values can be a difference image. The difference image created in this manner can be encrypted in the encryption unit 1730.

Figure 19:
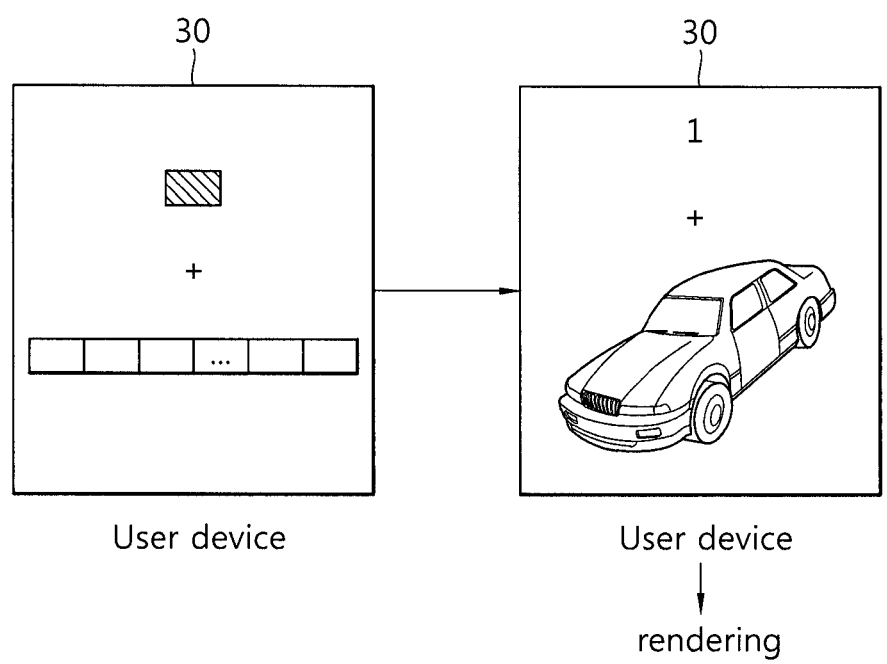
FIG. 19 illustrates a content rendering process of a user device according to a further embodiment of the present invention.

FIG. 19 illustrates a content rendering process of a user device according to a further embodiment of the present invention.

As described above, in case pattern-inserted content is transmitted, a user device can perform rendering of the received pattern content immediately.

With reference to FIG. 19, the user device 30 can receive separately an encrypted original content stream and a content stream related to difference values. Then the user device 30 creates an image and performs rendering thereof by combining the encrypted original content and difference values. In the case of leakage of the content created according to the aforementioned process, which user has leaked the content can be known by parsing the difference values based on user identification information. In other words, according to the present invention, duplication can be blocked as reverse traceability can be applied for content leakage.

The present invention has been described with reference to accompanying drawings and embodiments; however, the technical scope of the present invention is not limited to what is defined by the drawings or embodiments, and it should be understood by those skilled in the art that the present invention can be modified or revised in various ways without departing from the technical principles and scope of the present invention defined by the appended claims.

According to a DRM content stream transmission apparatus, method, and system of the present invention, copyright and leakage tracking information, which could not be inserted to contents in real-time due to such tasks as decrypting, decompression, and re-compression and re-encryption of contents after insertion of forensic watermarks carried out in the prior art unnecessarily to insert the forensic watermarks at a service stage, are enabled to be inserted into the contents in real-time, thereby not only providing security-enhanced contents but also servicing real-time content streaming services.

What is claimed is:

1. A content stream transmission apparatus with reverse traceability, comprising:
    a pattern insertion unit for dividing original content into a plurality of segments and for creating a plurality of pattern content sets including, for each segment of the plurality of segments,
        inserting a first pattern into the segment to generate a first pattern content for inclusion in a first pattern content set of the plurality of pattern content sets, and
        inserting a second pattern into the segment to generate a second pattern content for inclusion in a second pattern content set of the plurality of pattern content sets;
    an encryption unit for
        determining a plurality of difference values including, for each pattern content set, determining a difference value between the pattern content set and the segments of original content corresponding to the pattern content set, and
        encrypting the plurality of difference values;
    a difference value selection unit for selecting one of the plurality of encrypted difference values based on user identification information; and
    a transmission unit transmitting the original content and the selected encrypted difference value to a user device.

2. The apparatus of claim 1, wherein the pattern insertion unit includes a division unit dividing the original content into segments;
    a pattern creation unit creating at least two patterns for each segment and inserting the at least two patterns into the content; and an encryption unit encrypting the at least two pattern contents.

3. The apparatus of claim 2, wherein the division unit divides the original content by at least one of Group Of Pictures (GOP), slice, or MacroBlock (MB) group units.

4. The apparatus of claim 2, wherein the pattern creation unit includes an insertion unit for inserting a pattern into a particular pixel of the original content; and
a difference value extraction unit for extracting a difference value between the original content and the content into which a pattern has been inserted and storing the difference value.

5. The apparatus of claim 4, wherein the insertion unit creates the first pattern and the second pattern, different from each other by inserting a particular index or a data value into each of the segments.

6. The apparatus of claim 2, further comprising an insertion pattern database (DB) storing the difference value and information related to the division separately with content specific information.

7. The apparatus of claim 1, wherein the difference value selection unit comprises a user identification information reception unit for receiving user identification information with which individual users of the user devices are identified; and
a selection unit for selecting the difference values based on the received user identification information.

8. The apparatus of claim 7, wherein the user identification information is an authentication value provided for each user at the time of authenticating a user device or a streaming service.

9. The apparatus of claim 7, wherein the difference value selection unit obtains the difference value information by loading the information from the insertion pattern DB which includes pattern and division information or by creating patterns based on the loaded information.

10. The apparatus of claim 9, wherein the selection unit selects one of the difference values based on the user identification information by parsing the number of patterns corresponding to a base number of a particular number system or index of a reference table indicating a particular value.

11. A content stream transmission method with reverse traceability, comprising:
a pattern insertion step for dividing original content into a plurality of segments and for creating a plurality of pattern content sets including, for each segment of the plurality of segments,
inserting a first pattern into the segment to generate a first pattern content for inclusion in a first pattern content set of the plurality of pattern content sets, and
inserting a second pattern into the segment to generate a second pattern content for inclusion in a second pattern content set of the plurality of pattern content sets;
an encryption step for
determining a plurality of difference values including, for each pattern content set, determining a difference value between the pattern content set and the segments of original content corresponding to the pattern content set, and
encrypting the plurality of difference values;
a difference value selection step for selecting one of the plurality of encrypted difference values based on user identification information; and
a transmission step transmitting the original content and the selected encrypted difference value to a user device.

12. A content stream transmission apparatus with reverse traceability, comprising:
a pattern insertion for unit dividing compressed original content into a plurality of segments and for creating a plurality of pattern content sets including, for each segment of the plurality of segments,
inserting a first pattern into the segment to generate a first pattern content for inclusion in a first pattern content set of the plurality of pattern content sets, and
inserting a second pattern into the segment to generate a second pattern content for inclusion in a second pattern content set of the plurality of pattern content sets;
a difference value extraction unit for determining a plurality of difference values including, for each pattern content set, determining a difference between the pattern content set and the segments of original content corresponding to the pattern content set to extract and store the plurality of difference values;
an encryption unit for encrypting the original content and the plurality of difference values;
a difference value selection unit selecting one of the encrypted difference values based on user identification information; and
a transmission unit transmitting the selected encrypted difference value and the encrypted original content to a user device.

13. The apparatus of claim 12, wherein, while storing the encrypted difference value, the difference value extraction unit also manages location information related to the difference value.

14. A content stream transmission method with reverse traceability comprising:
a pattern insertion step for dividing compressed original content into a plurality of segments and for creating a plurality of pattern content sets including, for each segment,
inserting a first pattern into the segment to generate a first pattern content for inclusion in a first pattern content set of the plurality of pattern content sets, and
inserting a second pattern into the segment to generate a second pattern content for inclusion in a second pattern content set of the plurality of pattern content sets;
a difference value extraction step for determining a plurality of difference values including, for each pattern content set, determining a difference value between the pattern content set and the segments of the original content corresponding to the pattern content set, to extract and store the plurality of difference values;
an encryption step for encrypting the original content and the plurality of difference values;
a difference value selection step for selecting any one of the encrypted plurality of difference values based on user identification information; and
a transmission step for transmitting the selected encrypted difference value and the encrypted original content to a user device.

15. A content stream transmission and reception system with reverse traceability, comprising:
a content stream transmission apparatus for dividing original content into a plurality of segments, and for each segment of the plurality of segments, inserting a first pattern into the segment to generate a first pattern content for inclusion in a first pattern content set of the plurality of pattern content sets, and inserting a second pattern into the segment to generate a second pattern content for inclusion in a second pattern content set of the plurality of pattern content sets;

compressing and encrypting a plurality of difference values between the plurality of pattern content sets and the segments of the original content corresponding to the plurality of pattern content sets;

selecting any one of the plurality of encrypted difference values based on user identification information; and transmitting the original content and the selected encrypted difference value to a user device; and a user device rendering content by receiving and combining the original content and the encrypted selected difference value.

* * * * *